Jan. 4, 1938.  P. E. HUNTER ET AL  2,104,258
SAWING APPARATUS
Filed April 2, 1936  4 Sheets-Sheet 1

INVENTORS
Percy E. Hunter
& Edward Nightingale,
By Archworth Martin,
Attorney.

Jan. 4, 1938.   P. E. HUNTER ET AL   2,104,258
SAWING APPARATUS
Filed April 2, 1936   4 Sheets-Sheet 3

INVENTORS
Percy E. Hunter
& Edward Nightingale,
By Archworth Martin,
Attorney.

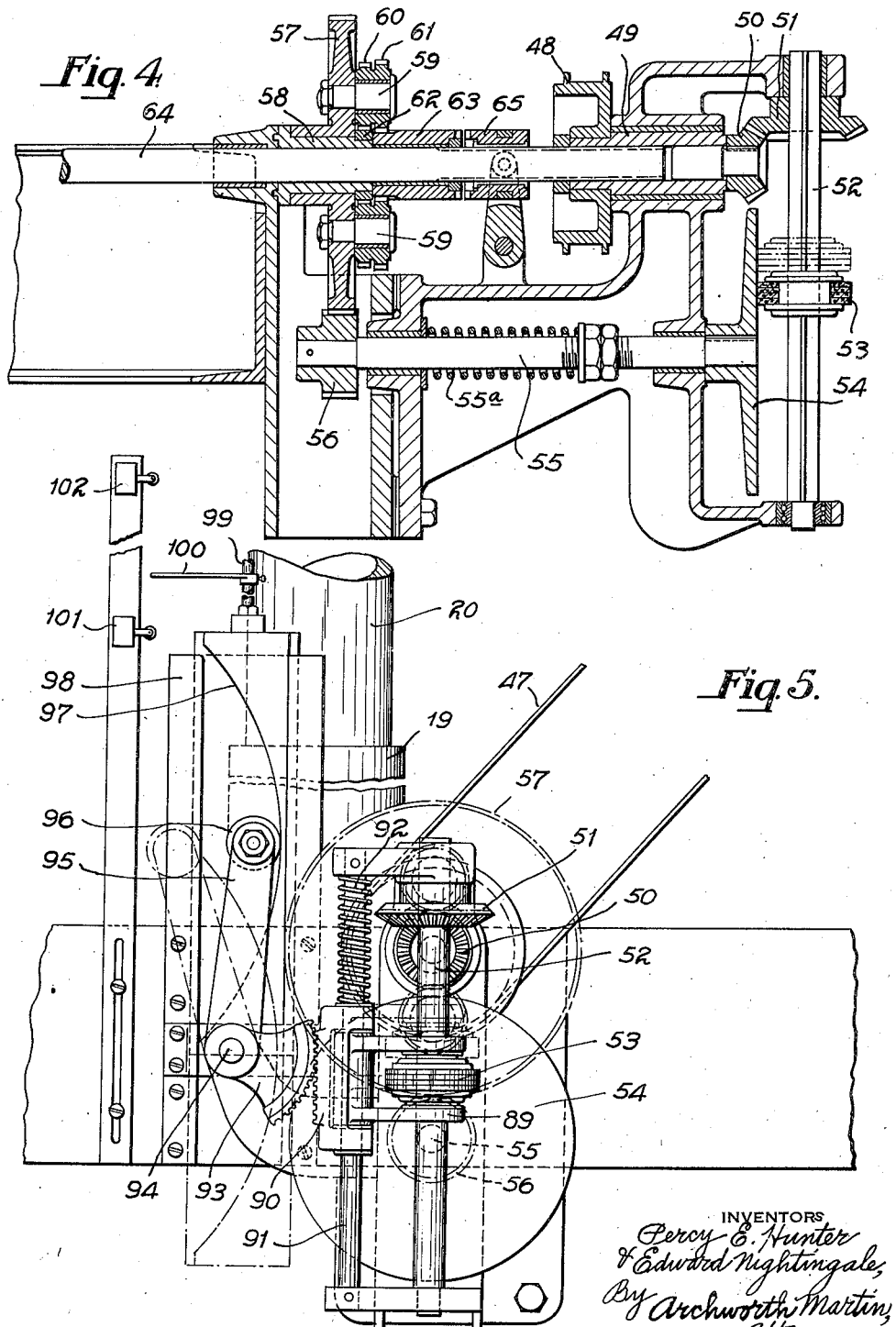

Patented Jan. 4, 1938

2,104,258

UNITED STATES PATENT OFFICE 2,104,258

SAWING APPARATUS

Percy E. Hunter, Pittsburgh, and Edward Nightingale, Haysville, Pa.; L. T. Copeland and Fidelity Trust Company, administrators of said Percy E. Hunter, deceased, assignors, by direct and mesne assignments, to Hunter Steel Company, Pittsburgh, Pa., a corporation of Pennsylvania Application April 2, 1936, Serial No. 72,324

12 Claims. (Cl. 29—68)

Our invention relates to sawing machines and is hereinafter described as employed in the sawing of metal, but it will be understood that the apparatus can be employed also in the sawing of other materials.

The apparatus as hereindescribed is shown as of the band saw type for making saw cuts along curved or arcuate lines, but certain features of the invention would be applicable also to machines employing saws of the straight reciprocating type.

In the sawing of metal or other hard materials along curved or arcuate lines transversely of the material to be cut, better cutting efficiency is secured if the feeding movement of the saw along the line to be cut is maintained at a constant rate. If the saw is advanced in a linear path from one side of the material to the other side at a constant rate, when cutting on an arcuate line, the feed will either be too rapid in zones adjacent to where the saw enters the material and where the saw leaves the material, or too slow at points near the middle of the arc. The result is that either the cutting speed has to be at too slow a rate near the mid zone of the arc, or is at too fast a rate near the ends of the arc.

Our invention has for one of its objects the provision of means for moving the opposite running sides of a saw band simultaneously through the material to be cut on arcuate lines.

Another object of our invention is to provide means for automatically varying the linear movement of a saw carrier in accordance with changes in the angular positions of the saw relative thereto when sawing on a curved line, to obtain a uniform rate of feed of the saw through the work.

Another object of our invention is to provide sawing apparatus whereby bars or the like may be divided into pieces by cutting along curved lines, with a minimum of scrap loss.

Still another object of our invention is to provide means for making links of uniform dimension for chains, or other members, with curved ends which will not require subsequent dressing or smoothing operations.

Figure 1:
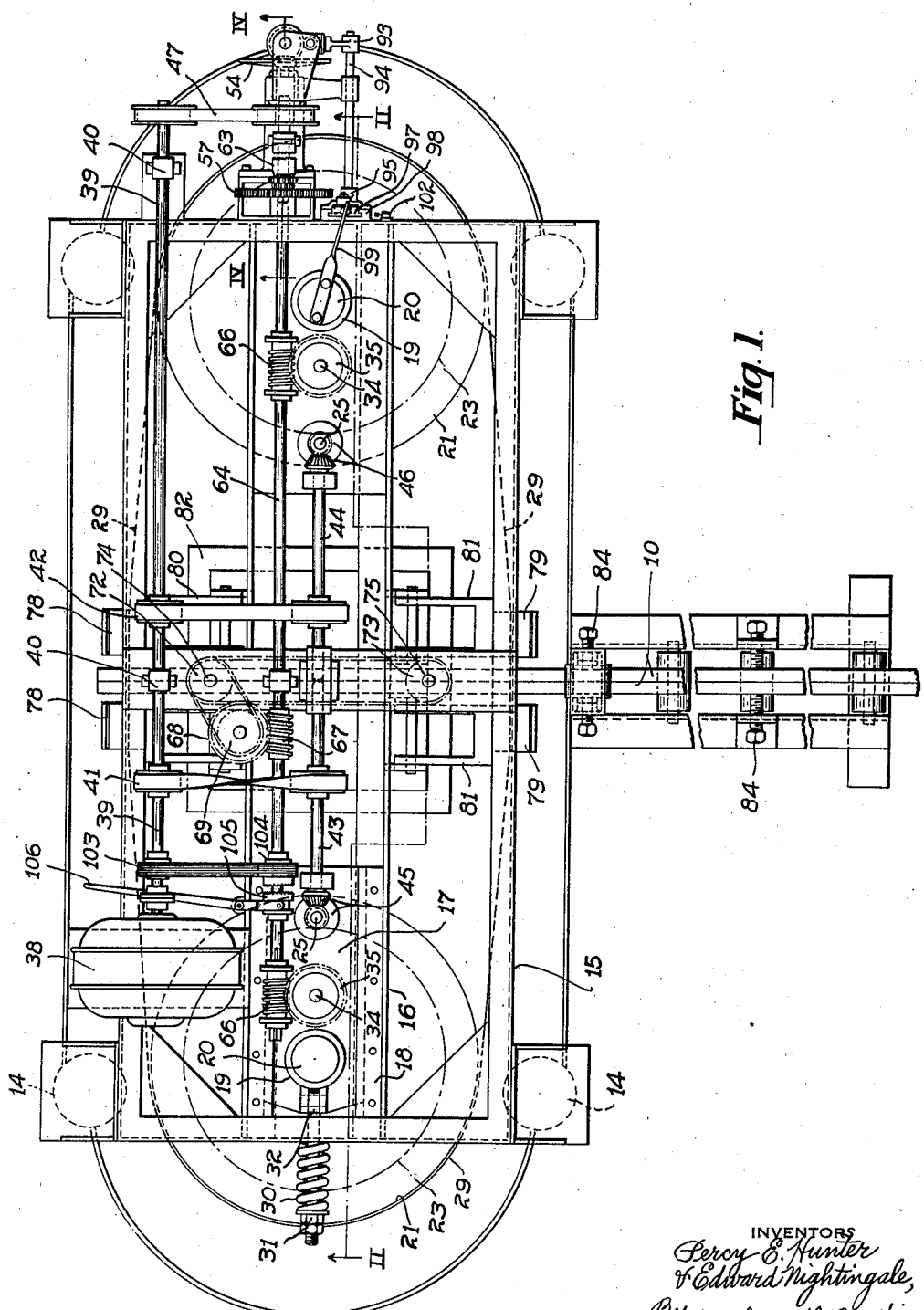
Figure 2:
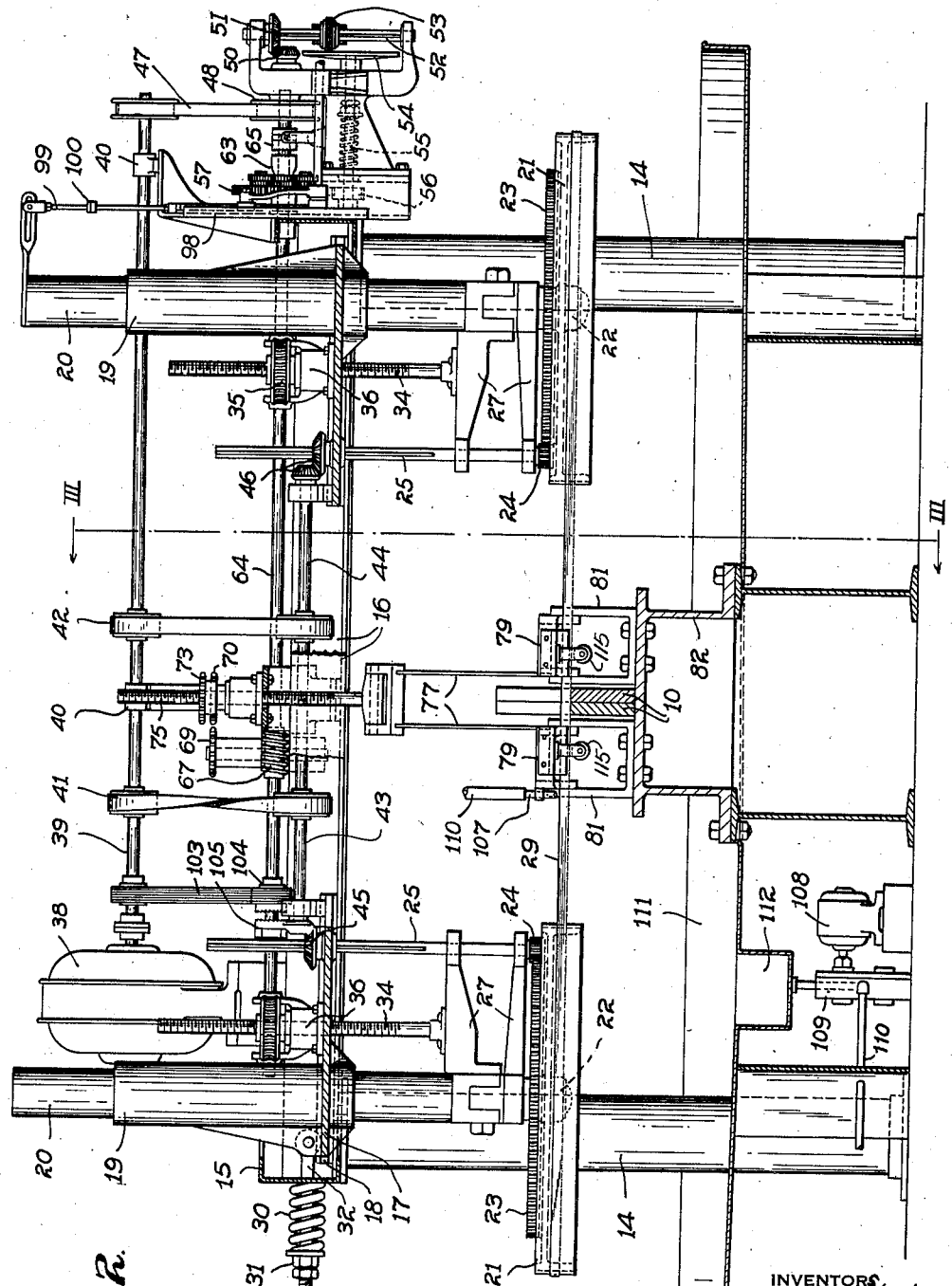
Figure 3:
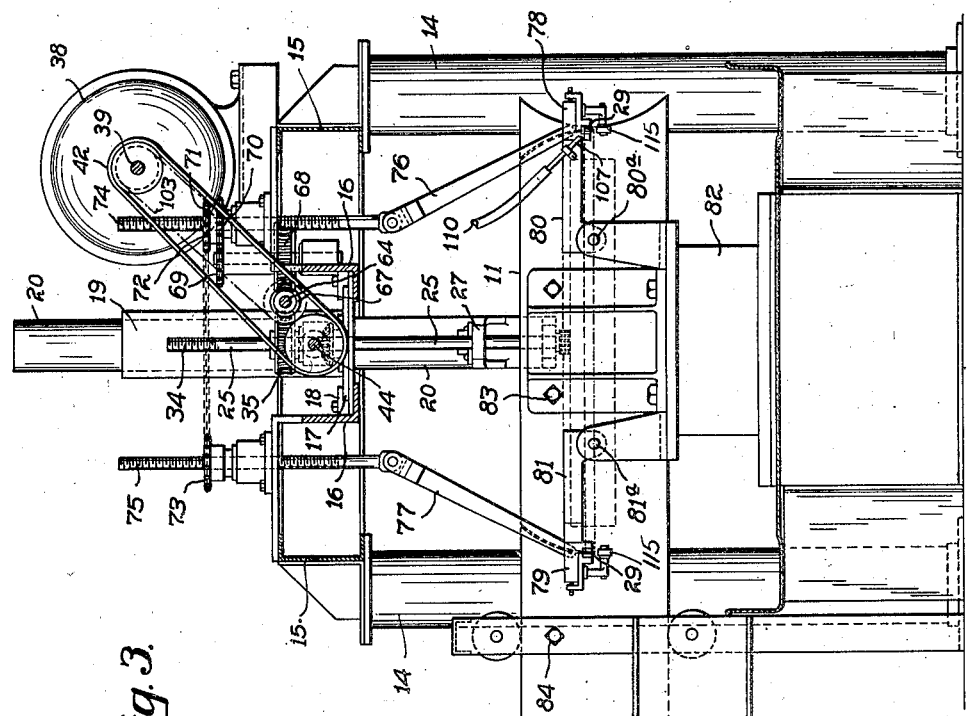
Figure 6:
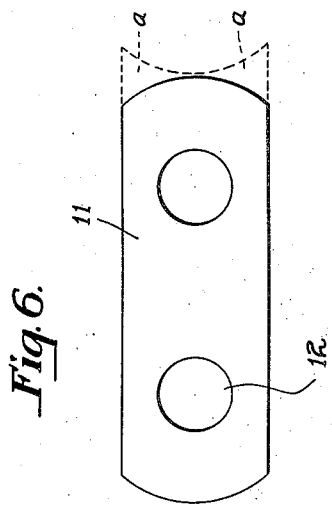

One form which our invention may take is shown in the accompanying drawings wherein Figure 1 is a plan view of a sawing machine; Fig. 2 is a view taken on the line II—II of Fig. 1; Fig. 3 is a view taken on the line III—III of Fig. 2; Fig. 4 is an enlarged view taken on the line IV—IV of Fig. 1; Fig. 5 is an end view of the structure of Fig. 4 and Fig. 6 is a view showing a link plate produced by the apparatus of the other figures.

The machine is designed for sawing long bars or strips 10 into short sections or pieces along curved lines at their ends, to form link plates 11 that are uniformly of equal lengths. The link plates 11 may be assembled on pintles, in side-by-side and interspersed relation, to form drive chains of the heavier types, conveyer chains etc., holes 12 being cut through the link plates in order to accommodate the pintles. In employing high price alloy metals, including high carbon steel, the matter of scrap loss is an important factor, and the value of the scrap pieces will depend largely upon the sizes thereof. In the present instance, the scrap piece or pieces between each of two adjacent link plates is represented in Fig. 6 by the letters aa.

These larger scrap pieces can more readily be put to other uses than could smaller pieces such as would be secured if a single straight cut was made through the metal of the zones a, and the ends of the links then dressed or cut down to the proper curved contour.

The machine comprises corner posts 14 that support framework 15. The framework supports angle bars 16. Adjacent to each end of the angle bars a plate 17 is mounted, one of the plates being mounted in a guide way 18 for movement longitudinally of the framework. Each plate 17 carries a sleeve 19 through which extends a column 20 which is slidable therethrough. At the lower end of the column 20, a band wheel 21 is rotatably mounted on a bearing or shaft, as indicated at 22. A gear wheel 23 is secured to each band wheel 21 and is driven by a pinion 24. The pinions 24 are mounted on shafts 25 which are journaled in brackets 27, which are secured to the lower ends of the columns 20. A band saw 29 extends around and is driven by the band wheels 21, the wheels or drums preferably having friction facings of fibrous or other suitable material.

In order to maintain driving tension on the saw 29, one plate 17 is urged to the left (Fig. 2) in its guide way by a spring 30 which abuts against the frame 15, and is maintained under tension by a nut 31 that is carried by a rod or eye-bolt 32 which is connected at the inner end to the slide plate 17. The springs 30 will yield when the band saw is deflected at its mid portion as hereinafter explained.

The columns 20, together with the band wheels and other parts carried thereby, are vertically supported by means of rods 34 which have screwthreaded connection with the hubs of worm wheels 35, that are supported on suitable bearings 36 carried by the plates 17.

A motor 38 is mounted on the framework and drives a shaft 39 which is suitably supported in bearings 40 carried by the framework of the machine. The shaft 39 has pulleys which drive belts 41 and 42, that in turn drive shafts 43 and 44 respectively. The belt 41 is crossed so that the shaft 43 will be driven in a direction opposite to the direction of rotation of the shaft 44. The shaft 43 through bevelled gear wheels 45 drives one shaft 25 and one of the band wheels 21, while the shaft 44 operating through bevelled gear wheels 46 drives the other shaft 25 and band wheel 21. The shafts 25 have sliding key connection with their respective bevelled gear wheels so that they can be slid up and down during operation of the saw.

The linear travel of the saw band is at a constant rate of speed, but the rate of downward movement of the saw into the material 10 is varied. The shaft 39, through a belt 47, drives a pulley 48 mounted on a sleeve 49 (Figs. 4 and 5). The sleeve, through bevelled gear wheels 50 and 51, drives a shaft 52 that has a friction roller or pinion 53, that has a sliding key fit with the shaft 52 and drives a friction disc 54. The friction disc 54 is secured to a shaft 55 that carries a pinion 56, which meshes with a gear wheel 57 that is journaled on a sleeve 58. A spring 55a maintains the disc 54 in engagement with the roller 53.

The gear wheel 57 carries a pair of stud shafts 59 on each of which is journaled a pair of differential gear elements 60 and 61. The gear element 60 meshes with a fixed gear 62 that is rigid with respect to the stationary collar or sleeve 58. The gear element 61 meshes with teeth on a collar 63 that is rotatable on a shaft 64 and serves as a clutch element. A second clutch element 65 is slidably keyed to the shaft 64 and is movable into and out of engagement with the collar 63.

When the members 63 and 65 are in engagement with one another, the shaft 64 is driven from the shaft 39 through the transmission elements just described. The differential elements 60 and 61 together with the toothed elements 62 and 63 serve in effect as a planetary transmission whereby greater speed reduction is secured as between the friction disc 54 and the shaft 64.

The shaft 64 has worms 66 that respectively mesh with the worm wheels 35, for lowering the rods 34 and the columns 20 which carry the saw.

The shaft 64 is provided with another worm 67 that meshes with a worm wheel 68 which is journaled on one of the frame members 16. The shaft of the worm wheel carries a sprocket wheel 69 having a chain drive connection with a sprocket wheel 70 which has a hub 71, which also carries a sprocket wheel 72. The sprocket wheel 72 has a chain drive with a sprocket wheel 73. The hubs of the sprocket wheels 70 and 73 have threaded connection with rods 74 and 75 respectively. The lower ends of the rods carry links 76 and 77 respectively, which at their lower ends have pivotal connection with slotted saw guides or skewing members 78 and 79 respectively, of any well-known form.

The saw guides are carried by arms 80 and 81 which are pivotally mounted upon a stationary pedestal 82. The guides 78 and 79 are each arranged in pairs as shown in Figs. 1 and 2, and disposed at opposite sides of the bar stock 10 which is to be cut. It will be seen that when the rods 74 and 75 are moved down, they will move the saw guides through arcuate paths, about the pivots 80a and 81a as centers, causing the portions of the band saw 29 between the pairs of saw guides to be moved through corresponding arcuate paths.

As shown more clearly in Figs. 1 and 3, the paths of movement of the saw guides 78 and 79 are disposed transversely or crosswise of the path of feeding movement of the band wheels and the band saw carried thereby, and extend in directions corresponding to the direction of such feeding movement. Thus, during feeding movement of the saw band, the saw guides, simultaneously therewith, are moved bodily toward the work in curved paths of travel, thereby deflecting the runs of the saw out of their normal straight paths of feeding movement and forcing them through the work along lines that correspond to the curved paths of travel of the saw guides.

As shown in the drawings, the work consists of bars or strips 10 which are simultaneously advanced into position beneath the band saw and rigidly held by clamps 83 and 84 (Fig. 3). The clamps 83 not only hold the bar stock during sawing, but prevent relative movement between the pieces of the bar stock after completion of a sawing operation.

The rate of downward movement of the rods 34, 74 and 75 is controlled by the friction drive 53—54. The vertical position of contact of the friction pinion 53 with the face of the disc 54 determines the rate at which the friction wheel 54 is driven. The pinion element 53 is journaled in a fork 89 that is carried by a bracket 90. The bracket 90 is vertically slidable on a guide rod 91, and normally urged down by a spring 92. The bracket 90 has rack teeth formed on one side thereof that mesh with a gear sector or toothed quadrant 93, which is secured to a rock shaft 94, that has an arm 95 rigidly secured thereto. The arm 95 carries a roller 96 which cooperates with the curved surface of a camming member 97, contact being maintained between the roller and the cam surface by the pressure of the spring 92. The cam 97 is vertically movable in a slide way 98 and is connected to one of the columns 20 by connecting means 99, so that it will move up and down with the said column.

The curvature of the cam 97 corresponds to the curvature to which the ends of the link plates 11 are cut. At the beginning of downward movement of the saw into the work, the lower portion of the cam surface 97 (Fig. 5) will be in a raised position, opposite to the roller 96 on the arm 95. The pinion 53 will therefore be raised to the predetermined position shown by broken lines in Fig. 5, so that the shaft 64 will be driven at a predetermined low rate of speed and the vertical component or linear rate of movement of the saw carrier device will be slow. As the columns 20, and consequently the saw, move downwardly, the cam 97 will also be moved down to its full line position, thereby permitting movement of the roller 53 toward the center of the disc 54, with consequent increase in the linear rate of movement of saw carrier. As the saw moves toward the opposite edge of the work, the cam 97 will again shift the pinion 53 toward the edge of the disc and reduce the rate of downward movement of the saw.

The increase and decrease in the rate of linear movement of the saw carrier is effected in accordance with the changes in the angular position of the saw relative to the line of movement of the saw carrier, thereby obtaining a uniform rate of feed of the saw through the work. It will thus be seen that while the saw is cutting in zones near the edges of the work, the actual vertical movement thereof is slower than when it is cutting at the middle zone of the work. The amount of material which must be cut for each inch of vertical travel near the edges of the work is, of course, considerably greater than the amount of material to be cut per inch of vertical movement near the middle of the work, because of the angular position of the saw blade relative to said line of movement. Therefore, the saw can be given a more rapid rate of travel near the middle of the work than near the edges thereof, permitting of uniform cutting speed and securing greater efficiency than if the saw feed was as slow at the mid portion as it must be near the edges thereof.

When the material has been completely cut through, a tripping arm 100 carried by the connecting means 99 actuates a switch 101 that opens the circuit of the motor 38. The motor can then be restarted and upon completion of retractive movement of the saw-feeding device the arm 100 will open a switch 102 which will again break the circuit through the motor 38.

In order to raise the saw after a cut has been completed we provide mechanism which includes a chain 103 driven from the shaft 39 and having driving connection with a sprocket wheel 104 which is loosely mounted on the shaft 64. A clutch element 105 is slidably keyed on the shaft 64 and is movable by a hand lever 106 into and out of engagement with the pulley 104. This arrangement causes the shaft 64 to be driven in a direction opposite to that in which it is driven by the friction drive mechanism above described, it being understood that the clutch 63—65 is disengaged when the clutch 105 is rendered operative. With the clutch 105 in driving engagement with the shaft 64, the worm wheels 66 and 67 will be rotated rapidly to raise the rods 34, 74 and 75 to thereby lift the band saw wheels 21 and the saw guides 78 and 79.

Should there be any tendency for the saw band to move out of the slots in the guides 78 and 79 during such lifting movement, the saw will move into engagement with rollers 115 that are spaced beneath the cutting edge of the saw and mounted on brackets carried by the saw guides, thereby limiting the movement of the saw relative to the saw guides, and positively raising the saw. When again feeding the saw downwardly, the bottoms of the slots in the saw guides press against the back edge of the saw band and force the saw through the work.

The band saw is lubricated by means of oil pipes 107 to which oil is pumped by a motor 108 and pump 109, through suitable lines 110. The surplus oil will be caught by a drip pan or trough 111 from which it will flow to a sump 112 and the pump 109.

We claim as our invention:—

1. Sawing apparatus comprising a saw blade and means for imparting sawing movement thereto, means for imparting relative feeding movement to the saw and the material to be cut, a device for imparting relative skewing movement to the saw and the material, and means controlled through the operation of said skewing device, for varying the said relative rate of movement, to maintain uniform rate of cutting.

2. Sawing apparatus comprising a saw blade and means for imparting sawing movement thereto, means movable in a rectilinear path, for imparting relative feeding movement to the saw and the material to be cut, a device for imparting relative skewing movement to the saw and the material, to produce a cut along an arcuate line, and means controlled through the operation of said skewing device to increase the rate of said rectilinear movement in those portions of the path which are of small angularity relative to the line of rectilinear movement.

3. Sawing apparatus comprising a saw blade and means for imparting sawing movement thereto, means for feeding the saw through the material being cut, a device for skewing the saw blade to cause it to follow a non-rectilinear path through the material, and means controlled through the operation of said skewing device, for varying the rate at which the saw is fed toward the point at which the cut is to be finished.

4. Sawing apparatus comprising a band saw and band wheels therefor, means for imparting relative feeding movement to the saw and the material to be cut, in such relative position that the opposite running sides of the band will both engage the work, means for skewing the said opposite sides of the band to produce cuts through the material along arcuate lines, extending in directions generally parallel to the direction of feeding movement, and means controlled through the operation of said skewing means, for varying the said relative rate of movement, to maintain uniform rate of cutting along said arcuate lines.

5. Sawing apparatus comprising a band saw and band wheels therefor, means for feeding the said wheels and saw toward the work, guide elements engaging the opposite running sides of the band saw at points between the band wheels, and means for moving said guides bodily in unison with said feeding movement of the saw in arcuate paths disposed transversely of the path of feeding movement of the saw and extending in directions corresponding to the direction of said feeding movement, to produce cuts through the work along arcuate lines.

6. Sawing apparatus comprising a band saw and band wheels therefor, means for feeding the said wheels and saw toward the work, guide elements engaging the opposite running sides of the band saw at points between the band wheels, and means for supporting said guides for pivotal movement during the operation of the feeding means, the axes of said pivotal movements being disposed between the said oppositely moving sides of the band saw.

7. Sawing apparatus comprising a band saw and band wheels therefor, means for feeding said wheels and said saw toward the work, means for supporting the work in the path of feeding movement of one of the opposite running sides of the band saw, a saw skewing device engaging said run of the saw, means for supporting said device for movement toward the work in a laterally curved path extending in a direction corresponding to the direction of feeding movement of the saw, and means for moving said device in said curved path in unison with said feeding movement of the saw, to move the said run of the saw through the work along a curved line.

8. Sawing apparatus comprising a band saw and band wheels therefor, means for feeding said wheels and said saw toward the material to be cut, means for supporting the material transversely of the path of feeding movement of one of the opposite running sides of the saw band, a pair of saw guides engaging said run of the saw, at points disposed at opposite sides of the material, means for supporting said guides for movement toward the material in a laterally curved path extending in a direction corresponding to the direction of feeding movement of the saw, and means operatively connected to said saw feeding means, for moving said guides along said curved path in unison with said feeding movement of the saw, to force said run of the saw through the material along a corresponding curved line.

9. Sawing apparatus comprising a band saw and band wheels therefor, means for feeding the said wheels and saw toward the work, a pair of saw guides engaging one of the opposite running sides of the saw at points between the band wheels, a supporting arm for each saw guide, pivotally mounted for movement on an axis parallel to the run of the saw, and carrying said guide adjacent to its movable end, and means operatively connected to said feeding means for moving said guide-supporting arms toward the work, simultaneously with feeding movement of the saw.

10. Sawing apparatus comprising a band saw and band wheels therefor, means for feeding the said wheels and saw toward the work, a pair of saw guides engaging one of the opposite running sides of the saw at points between the band wheels, a supporting arm for each saw guide, pivotally mounted for movement on an axis parallel to the run of the saw, and carrying said guide adjacent to its movable end, means for moving said guide-supporting arms toward the work simultanously with feeding movement of the saw, the axes of pivotal movement of the saw guide-supporting arms being disposed intermediate the limits of feeding movement of the saw, and means controlled in accordance with changes in the angular position of said supporting arms relative to said limits of feeding movement, for varying the rate of feeding movement of the saw.

11. Sawing apparatus comprising a band saw and band wheels therefor, means movable in a rectilinear path, for feeding said wheels and said saw toward the work, guide means engaging one of the opposite running sides of the band saw and movable in a curved path disposed transversely of said path of feeding movement, said rectilinear path and said curved path extending in the same general direction, driving means operatively connected to each of said movable means for simultaneously moving the same in their respective paths of travel, and means for supporting the work in said curved path of travel of said run of the saw.

12. Sawing apparatus comprising a band saw and band wheels therefor, means for feeding said wheels and said saw toward the work, means for supporting the work in the path of travel of one of the opposite running sides of the band saw, a skewing device engaging said run of the saw, means for moving said skewing device bodily in a path disposed transversely of said path of feeding movement, but extending in a direction corresponding generally to the direction of said feeding movement, and means operatively connected to said feeding means and said skewing device, for effecting simultaneous movement thereof toward the work.

PERCY E. HUNTER.
EDWARD NIGHTINGALE.